(12) United States Patent  (10) Patent No.: US 8,368,930 B2
Matsuura et al.  (45) Date of Patent: Feb. 5, 2013

(54) JOB EXECUTION SYSTEM, IMAGE PROCESSING APPARATUS, JOB EXECUTION METHOD AND RECORDING MEDIUM

(75) Inventors: Tsumoru Matsuura, Toyohashi (JP); Shin Ohba, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 619 days.

(21) Appl. No.: 12/561,062

(22) Filed: Sep. 16, 2009

(65) Prior Publication Data

US 2010/0067050 A1 Mar. 18, 2010

(30) Foreign Application Priority Data

Sep. 16, 2008 (JP) ................. 2008-237174

(51) Int. Cl.
*G06F 15/00* (2006.01)
*G03G 15/00* (2006.01)
(52) U.S. Cl. .......................... 358/1.15; 399/81
(58) Field of Classification Search .................. 358/1.15
See application file for complete search history.

(56) References Cited

U.S. PATENT DOCUMENTS

| 5,508,819 | A | 4/1996 | Yanagisawa |
| 2006/0119874 | A1* | 6/2006 | Kurihara ............... 358/1.13 |
| 2006/0279810 | A1 | 12/2006 | Momose et al. |
| 2008/0239373 | A1* | 10/2008 | Suzuki ............... 358/1.15 |

FOREIGN PATENT DOCUMENTS

| JP | 5-92841 | 4/1993 |
| JP | 5-178469 | 7/1993 |
| JP | 6-318993 | 11/1994 |
| JP | 11-331446 | 11/1999 |

* cited by examiner

*Primary Examiner* — Saeid Ebrahimi Dehkordy
(74) *Attorney, Agent, or Firm* — Morrison & Foerster LLP

(57) ABSTRACT

A job execution system includes a terminal apparatus and an image processing apparatus. The terminal apparatus includes an accepter that accepts a value set by a user for one or more than one setting item to execute a job by the image processing apparatus and a transmitter that transmits the job including the accepted value, to the image processing apparatus. In the image processing apparatus, a judger judges whether or not there exists a setting item for which the value "to be specified" is set in advance, among those included in the job received by a receiver, to execute the job. And if it judged that there exists, a job executor puts on hold execution of the job and a display portion displays a setting screen that allows a user to specify a value for the setting item for which the value "to be specified" is set in advance.

20 Claims, 10 Drawing Sheets

@PJL SET PAPERTYPE=ENVELOPE

@PJL SET ENVFLAPPOSITION=UNFIX

@PJL SET ENVFLAPOPEN=UNFIX

FIG.7

| Jam Log Information | | | | | Paper Material | | | |
|---|---|---|---|---|---|---|---|---|
| Flap Position | Flap State | Which Surface Up Paper Will be Fed With | Paper Feeding Direction | Paper Feeding Slot | Cotton | Craft | Tracing | Japanese |
| Top | Open | Front | ShortEdgeFeed | Manual Feeding Tray | 0/3 | 0/0 | 0/0 | 1/1 |
| | | | | Cassette 1 | 3/3 | 1/1 | 0/0 | 2/5 |
| | | | LongEdgeFeed | Manual Feeding Tray | 5/20 | 1/10 | 0/1 | 3/6 |
| | | | | Cassette 1 | 3/20 | 0/10 | 3/4 | 1/9 |
| | | Back | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |
| | Closed | Front | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |
| | | Back | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |
| Right | Open | Front | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |
| | | Back | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |
| | Closed | Front | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |
| | | Back | ShortEdgeFeed | Manual Feeding Tray | x/y | x/y | x/y | x/y |
| | | | | Cassette 1 | x/y | x/y | x/y | x/y |
| | | | LongEdgeFeed | Manual Feeding Tray | x/y | x/y | x/y | x/y |
| | | | | Cassette 1 | x/y | x/y | x/y | x/y |

FIG.12

JOB EXECUTION SYSTEM, IMAGE PROCESSING APPARATUS, JOB EXECUTION METHOD AND RECORDING MEDIUM

This application claims priority under 35 U.S.C. §119 to Japanese Patent Application No. 2008-237174 filed on Sep. 16, 2008, the entire disclosure of which is incorporated herein by reference in its entirety.

BACKGROUND OF THE INVENTION

1. Field of the Invention

The present invention relates to a job execution system in which an image processing apparatus and a terminal apparatus are interconnected via a network, an image processing apparatus preferably employed in the job execution system, a job execution method, and a computer readable recording medium having a job execution program recorded therein to make a computer of the image processing apparatus execute a job execution process.

2. Description of the Related Art

The following description sets forth the inventor's knowledge of related art and problems therein and should not be construed as an admission of knowledge in the prior art.

It is a conventional practice that users set values for a job and give the job to the image processing apparatus, by using a terminal apparatus, in the above-mentioned job execution system.

For example, in order to make an image forming apparatus serving as the image processing apparatus, print a document and etc. created by operating the terminal apparatus, values are set for respective print setting item such as paper type, paper feeding direction, paper feeding inlet and number of sets, via a setting screen of a printer driver installed on the terminal apparatus, and a print job including these set values and document data is transmitted to the image forming apparatus. And by the image forming apparatus receiving the print job, the document data is printed out according to the set values.

When a value is set for a setting item via a setting screen of the printer driver, it is conventionally required to decide whether or not to set a value for the setting item, and if decide to set a value, a concrete value is necessary to be entered. Since the value set in this way is regarded as a user's intended one, the job is executed by the image forming apparatus according to the set value, except for some processes such as a ruling-out process (this is a process to rule out a specified operation such as a stapling operation, if such an operation is disabled).

As disclosed in Japanese Unexamined Laid-open Patent Publications No. H05-092841 and H05-178469, there is a technology to detect by a sensor, whether or not envelopes that are print paper are properly loaded on an image forming apparatus.

And as disclosed in Japanese Unexamined Laid-open Patent Publication No. H06-318993, there is a technology to put on hold transmission and request for a user's entry, if a part of header information of a facsimile is not entered.

However, there still exists an unresolved problem as described below, in the conventional technologies that require a value to be a concrete one when it is set for a setting item.

That is, users cannot avoid a trouble before the fact, if the trouble is not recognizable when setting values for respective setting items by operating the terminal apparatus but turns to be recognizable when arriving at the image forming apparatus.

For example, users cannot avoid a trouble before the fact, if a wrong value is set for flap position or flap state (open/closed) of the envelopes actually loaded on a manual feeding tray.

To resolve this trouble, it is conventionally required to set a right value again by operating the terminal apparatus, which is inconvenient and causes poor usability. Therefore, development of a technology to set values by operating the image forming apparatus, for setting items to execute a job that is given to the image forming apparatus by the terminal apparatus, has been desired.

However, the technologies described in the previously-mentioned publications do not bring a complete solution against the trouble described above, occurring between the terminal apparatus and the image forming apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a job execution system that allows to specify values by operating an image processing apparatus, for setting items to execute a job that is given to the image processing apparatus by a terminal apparatus, according to the set values.

It is another object of the present invention to provide an image processing apparatus preferably employed in the job execution system.

It is yet another object of the present invention to provide a job execution method implemented by the job execution system.

It is still yet another object of the present invention to provide a computer readable recording medium having a job execution program recorded therein to make a computer of the image processing apparatus execute a job execution process.

According to a first aspect of the present invention, a job execution system in which an image processing apparatus and a terminal apparatus are interconnected via a network, includes:

the terminal apparatus including:
  an accepter that accepts a value set by a user for one or more than one setting item to execute a job by the image processing apparatus; and
  a transmitter that transmits the job including the set value accepted by the accepter, to the image processing apparatus, and the image processing apparatus including:
  a receiver that receives the job transmitted by the terminal apparatus;
  a job executor that executes the job received by the receiver;
  a judger that judges whether or not there exists a setting item for which the value "to be specified" is set in advance, among those included in the job received by the receiver;
  a display portion; and a controller that makes the job executor put on hold execution of the job if the judger judges that there exists a setting item for which the value "to be specified" is set in advance, then further makes the display portion display a setting screen that allows a user to specify a value for the setting item for which the value "to be specified" is set in advance.

According to a second aspect of the present invention, an image processing apparatus includes:

a receiver that receives a job transmitted by a terminal apparatus via a network;

a job executor that executes the job received by the receiver;

a judger that judges whether or not there exists a setting item for which the value "to be specified" is set in advance, among one or more than one print setting item included in the job received by the receiver to execute the job;

a display portion; and a controller that makes the job executor put on hold execution of the job if the judger judges that there exists a setting item for which the value "to be specified" is set in advance, then further makes the display portion display a setting screen that allows a user to specify a value for the setting item for which the value "to be specified" is set in advance.

According to a third aspect of the present invention, a job execution method includes:

the terminal apparatus's accepting a value set by a user for one or more than one setting item to execute a job by the image processing apparatus;

the terminal apparatus's transmitting to the image processing apparatus, the job including the accepted set value;

the image processing apparatus's receiving the job transmitted by the terminal apparatus;

the image processing apparatus's executing the received job;

the image processing apparatus's judging whether or not there exists a setting item for which the value "to be specified" is set in advance, among the setting items included in the received job; and the image processing apparatus's putting on hold execution of the job if it is judged that there exists a setting item for which the value "to be specified" is set in advance, then further making a display portion display a setting screen that allows a user to specify a value for the setting item for which the value "to be specified" is set in advance.

According to a fourth aspect of the present invention, a computer readable recording medium has a job execution program recorded therein to make a computer of an image processing apparatus execute:

receiving a job transmitted by a terminal apparatus via a network;

executing the received job;

judging whether or not there exists a setting item for which the value "to be specified" is set in advance, among one or more than one setting item included in the received job to execute the job;

putting on hold execution of the job if it is judged that there exists a setting item for which the value "to be specified" is set in advance, then further making the display portion display a setting screen that allows a user to specify a value for the setting item for which the value "to be specified" is set in advance.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 7 is a view showing a configuration including the value "to be specified" set for setting items, converted into a printer language;

FIG. 12 is a view showing jam log information of the past;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
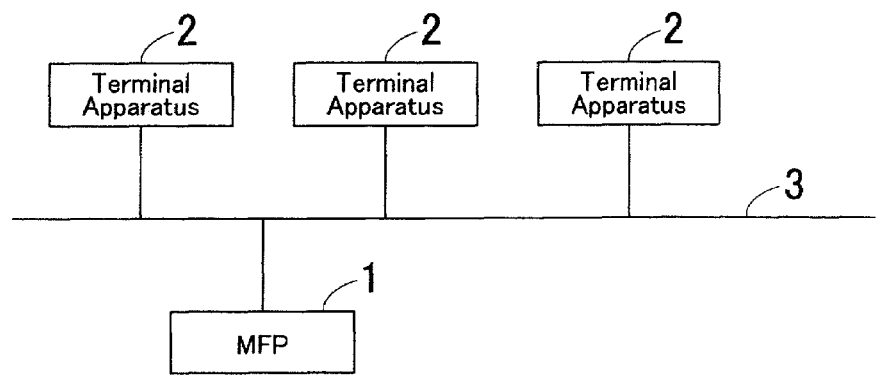
FIG. 1 is a block diagram showing an example of a job execution system in which an image processing apparatus according to one embodiment of the present invention is employed.

FIG. 1 is a block diagram showing an example of a job execution system in which an image processing apparatus according to one embodiment of the present invention is employed.

This system includes an image processing apparatus 1 and more than one terminal apparatus 2 owned by a user, and the image processing apparatus 1 and the terminal apparatus 2 are interconnected via a network 3 such as a LAN (Local Area Network).

The image processing apparatus 1 executes jobs given by the terminal apparatuses 2. In this embodiment, a MFP (Multi Function Peripheral) that is a multifunctional digital image forming apparatus collectively having the copy function, the print function, the FAX function and other functions, is employed as the image processing apparatus 1. Hereinafter, the image processing apparatus 1 will be also referred to as "MFP 1".

In this embodiment, a MFP is explained just as an example of an image processing apparatus, and an image processing apparatus may a printer, a facsimile or etc., alternatively.

Furthermore, in this embodiment, a job given by the terminal apparatuses 2 is a print job just for example, and it is not necessarily limited to a print job.

Figure 2:
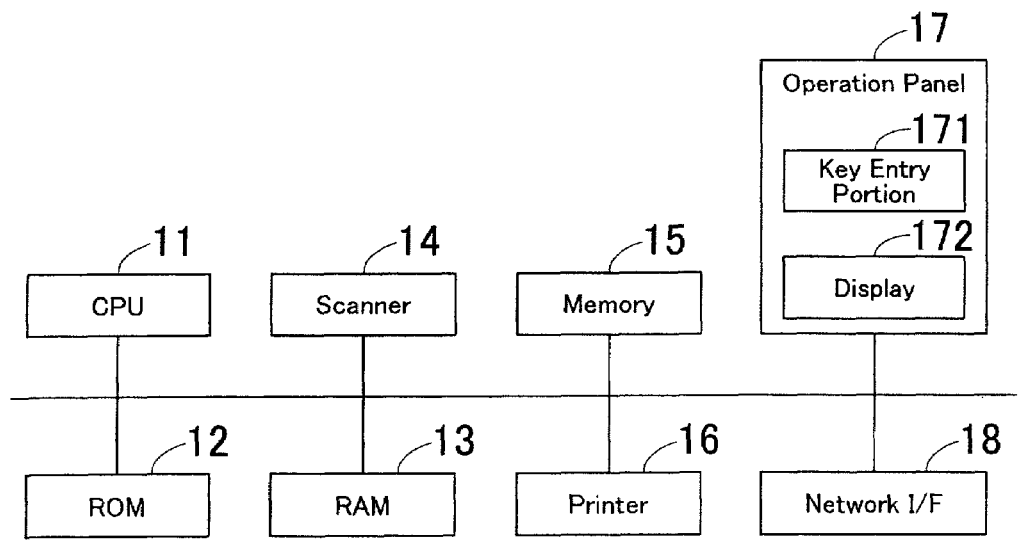
FIG. 2 is a block diagram schematically showing a configuration of a MFP.

FIG. 2 is a block diagram schematically showing a configuration of the MFP 1.

As shown in FIG. 2, this MFP 1 includes a CPU 11, a ROM 12, a RAM 13, a scanner 14, a memory 15, a printer 16, an operation panel 17, a network interface (network I/F) 18 and etc.

The CPU 11 centrally controls the entire MFP 1. Specifically, in this embodiment, the CPU 11 judges whether or not there exist any setting items for which the value "to be specified" is set, among the setting items to execute a print job received from the terminal apparatus 2. And according to a judgment result, it controls the printer 16, a display 172 of the operation panel 17 and etc. Operations controlled by the CPU 11 will be further described later.

The ROM 12 is a memory that stores in itself an operation program for the CPU 11, and other data.

The RAM 13 is a memory that provides a working area for the CPU 11 to execute processing according to an operation program.

The scanner 14 reads an image on a document placed on a document table (not shown in Figure) then outputs image data that is electronic data.

The memory 15 is constructed of a nonvolatile recording medium such as a hard disk drive (HDD). This memory 15 records in itself image data read out from a document by the scanner 14, data received from the terminal apparatuses 2 and other data. In this embodiment, the value "to be specified" and another value are set in advance as default values, for respective setting items to execute a print job, and the memory 15 also records these default values. Default values are not always necessary and no default values may be recorded.

The printer 16 prints out image data read out from a document by the scanner 14, print data received from the terminal apparatuses 2 and other data, according to set values, thus serving as a job executor.

The operation panel 17 is used for various entry operations and other operations. It includes a key entry portion 171 having numeric keys, a start key, a step key and other keys, and the display 172 that is a liquid crystal display with touch-panel functionality, which displays on itself operation states of the MFP 1, various screens, messages for users, and others.

The network interface 18 controls communications with the terminal apparatus 2 and other external apparatuses connected to the network 3.

Figure 3:
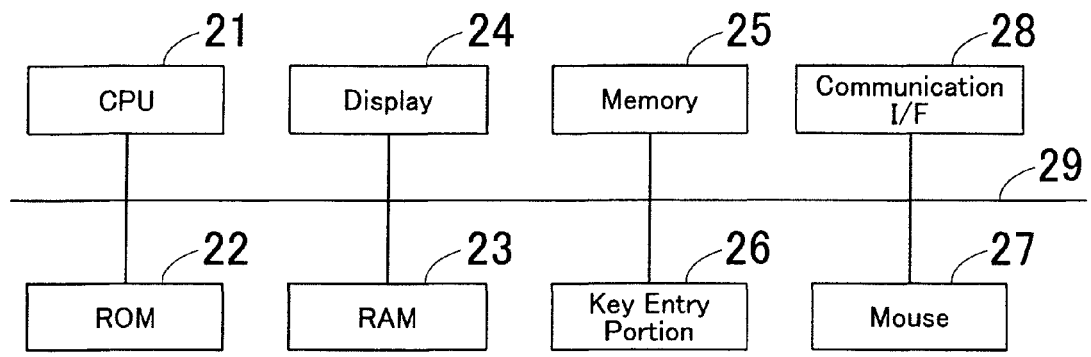
FIG. 3 is a block diagram showing a configuration of a terminal apparatus.

FIG. 3 is a block diagram showing a configuration of the terminal apparatus 2. In this embodiment, the terminal apparatus 2 is constructed of a personal computer.

As shown in FIG. 2, the terminal apparatus 2 includes a CPU 21, a ROM 22, a RAM 23, a display 24, a memory 25, a key entry portion 26, a mouse 27, a communication interface (communication I/F) 28 and others, and these included therein are interconnected via a system bus 29.

The CPU 21 centrally controls the entire terminal apparatus 2 by executing a program recorded in the ROM 22, the memory 25 or etc. Specifically, in this embodiment, the CPU 21 makes the display 24 display print setting screens according to a printer driver that is software to set values for a print job, accepts values set by users for respective print setting items, and transmits to the MFP 1, a print job including target print data and set values, which are converted into a printer language.

The ROM 22 is a recording medium that stores in itself a program executed by the CPU 21 and other data.

The RAM 23 is a recording medium that provides a working area for the CPU 21 to execute processing according to an operation program.

The display 24 is constructed of a CRT, a liquid crystal display or etc. and displays on itself various messages, the print setting screens mentioned above, documents created by users, and others.

The memory 25 is constructed of a recording medium such as a hard disk drive, and stores in itself various application programs and other data.

The key entry portion 26 and the mouse 27 are used by users for entry operations.

The communication interface (communication I/F) 28 serves as a communicator that exchanges data with the MFP 1 and other external apparatuses via the network 3.

In this embodiment, receiving a print job from the terminal apparatus 2, the MFP 1 judges whether or not there exist any print setting items for which the value "to be specified" is set, among those to execute the print job. If judges there exist any, the MFP 1 puts on hold a print operation of the printer 16, and displays a setting screen on the display 172 of the operation panel 17, in order to allow users to specify values for the print setting items for which the value "to be specified" is set.

Hereinafter, an overview of operations performed in the job execution system will be explained. In the following example, print data received from the terminal apparatus 2 is printed out on envelopes having flaps.

The memory 15 of the MFP 11 records in itself the value "to be specified" and other values set in advance for the setting items: paper type, flap position, flap state and others, as default values.

Default values are validated if there exist any setting items for which no values are set, in other words, if there exist no setting items for which the value "to be specified" or other values are set, among the data converted into a printer language, included in a job given by the terminal apparatus 2. Meanwhile, if there exist any setting items for which the value "to be specified" or other values are set, among the data converted into a printer language, the set values are validated.

Figure 4:
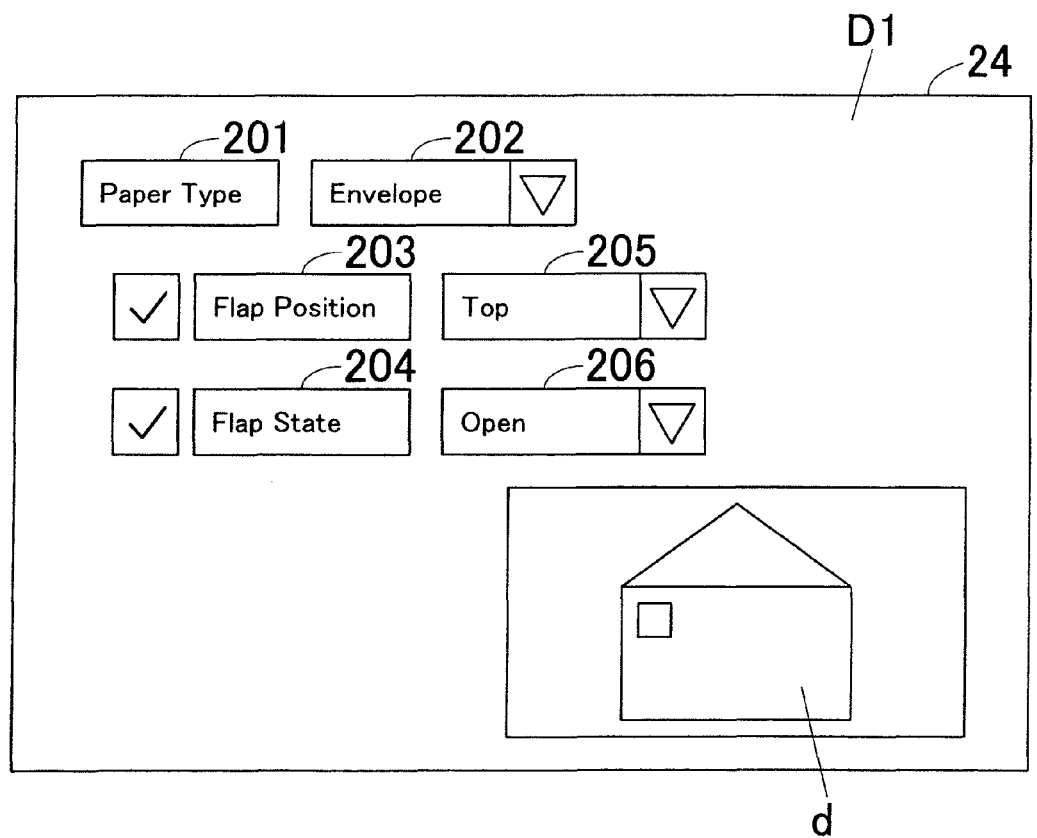
FIG. 4 is a view showing an example of a print setting screen displayed on the terminal apparatus.

As previously mentioned, the terminal apparatus 2 has a printer driver installed thereon, and thereby users are allowed to set values for the respective print setting items via a print setting screen D1 shown in FIG. 4. For example, the setting item 201 "paper type" is provided in the setting screen, and when the value 202 "envelope" is set for the setting item 201 "paper type", other values also can be set for the setting items 203 and 204, "flap position" and "flap state".

When hopes to print on envelopes, a user sets the value 202 "envelope" for the print setting item 201 "paper type" and gives a print instruction. If the user has a concrete plan of preferable envelopes to be printed, which flap position and which flap state, he/she reflects that plan by setting values for the setting item 203 "flap position" and the setting item 204 "flap state". For example, the value 205 "top" is set for the setting item 203 "flap position" and the value 206 "open" is set for the setting item 204 "flap state", as shown in the print setting screen D1 of FIG. 4. Those set values are displayed in a preview screen d also displayed in this print setting screen D1.

And such a print job including the set values as shown in FIG. 4 is transmitted to the MFP 1. Then, if envelopes matching the specified flap position and the specified flap state are already loaded on a paper feeding inlet, the MPF 1 feeds the envelopes and performs a print operation. If such envelopes are not loaded on a paper feeding inlet, the MFP 1 displays an appropriate message on the display 172 of the operation panel 17, to request the user to supply such envelopes.

When the user supplies envelopes according to the message, the MFP 1 feeds them and performs a print operation.

Figure 5:
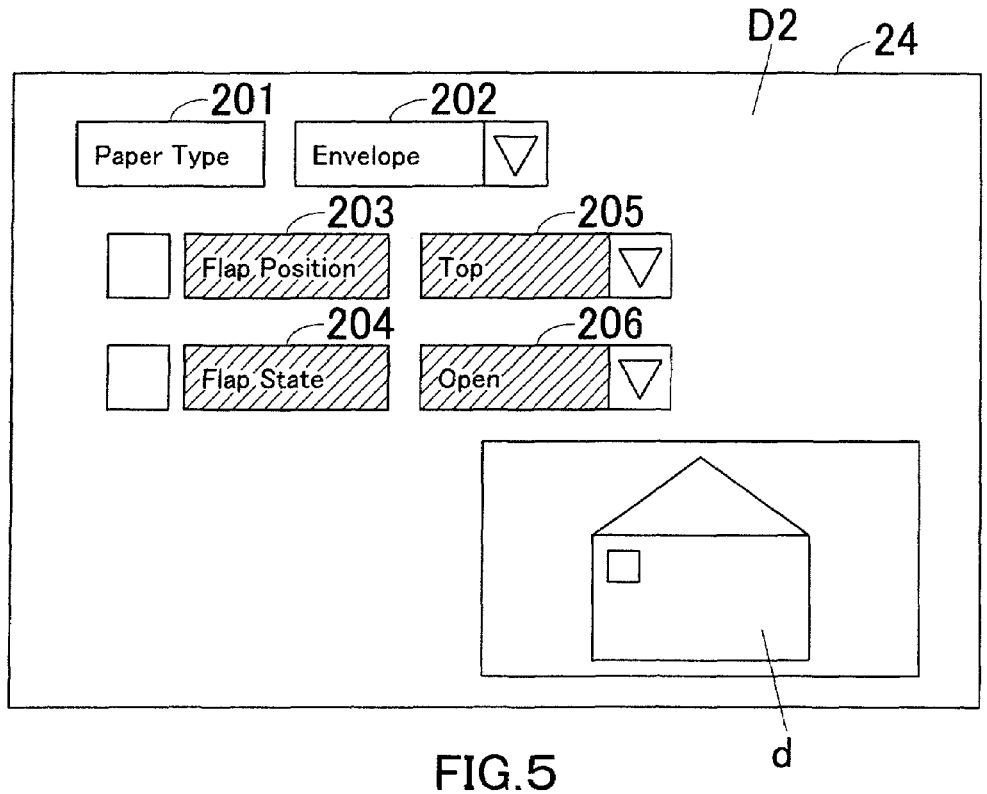
FIG. 5 is a view showing another example of a print setting screen displayed on the terminal apparatus.

When hopes to print on envelopes just according to the default values recorded in the MFP 1, without having a concrete plan, which flap position and which flap state, the user simply gives a print instruction without setting values for flap position and flap state. FIG. 5 shows a print setting screen D2 displayed in this case. In this case, the fields of the setting item 203 "flap position" and the setting item 204 "flap state" are grayed out (or hatched as shown in FIG. 5), indicating that no values are set for the setting items.

Accordingly, the MFP 1 receives a print job including the value "envelope" specifically set for paper type, but no values set for flap position and flap state. In this case, the default value (A4, for example) set for paper type, which is called out from the memory 15, is overwritten with the paper type specified by operating the terminal apparatus 2 ("envelope" in this embodiment). In other words, the value set by operating the terminal apparatus 2 is validated.

Meanwhile, the default values set for flap position and flap state, which are recorded in the MFP 1, are not overwritten (cannot be overwritten), since no values are set for them by operating the terminal apparatus 2. In other words, the default values recorded in the MFP 1 are validated.

As described above, if a value is set for a setting item by operating the terminal apparatus 2, the set value is validated, and if no value is set for a setting item by operating the terminal apparatus 2, a default value recorded in the MFP 1 is validated. Values are set for the respective setting items in this way, and a print operation is performed according to the set values.

Figure 6:
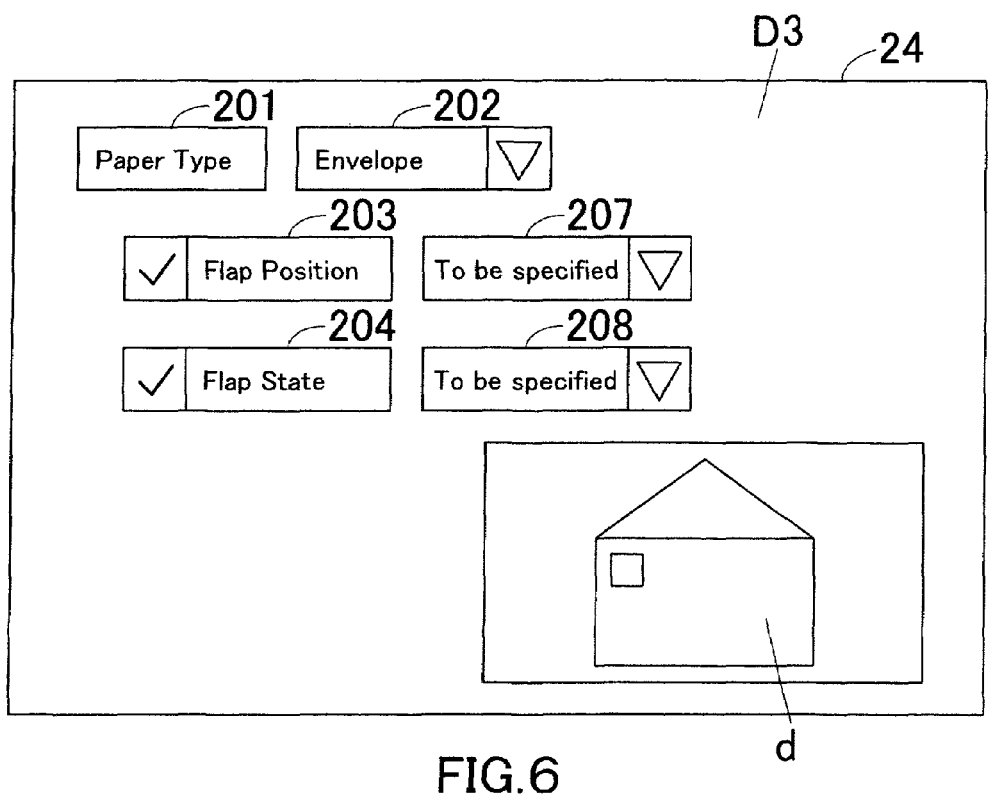
FIG. 6 is a view showing a print setting screen that is displayed on the terminal apparatus when the value "to be specified" is set for setting items.

In this embodiment, the value "to be specified" can be set for print setting items, by using a printer driver. When hopes to print on envelopes and later set values for flap position and flap state by operating the MFP 1, a user selects the value "to be specified" for the setting items "flap position" and "flap state", via a print setting screen displayed on the terminal apparatus 2. FIG. 6 shows a print setting screen D3 of a printer driver, displayed when the user sets the value 202 "envelope" for the setting item 201 "paper type" and the values 207 and 208 "to be specified" for the setting item 203 "flap position" and the setting item 204 "flap state", respectively. This configuration is accepted and decided by pressing a decision button not shown in Figure. Then, according to a printer driver, the configuration "paper size=envelope, flap position=to be specified, flap state=to be specified" is converted into a printer language that can be interpreted by the MFP 1, and a print job is transmitted to the MFP 1. FIG. 7 shows an example of the configuration converted into a printer language.

The MFP 1 interprets the configuration converted into a printer language, included in the received print job, and recognizes the configuration as "paper type=envelope, flap position=to be specified, flap state=to be specified".

According to the configuration in the received print job, if the value "to be specified" or other values are set for the respective setting items, the MFP 1 overwrites the default values recorded in advance in the MFP 1, with the set values included in the job. In other words, if a concrete value is set by the terminal apparatus 2, a default value is overwritten with the set value, and if the value "to be specified" is set by operating the terminal apparatus 2, a default value is also overwritten with the set value "to be specified". Meanwhile, if no value is set by operating the terminal apparatus 2, a default value is validated. Thus, if no value is set for a setting item by operating the terminal apparatus 2 and the value "to be specified" is recorded as a default value for this setting item in the MFP 1, the value "to be specified" is validated.

After deciding values for the respective print setting items to execute the print job in this way above, the MFP 1 judges whether or not there exist any setting items for which the value "to be specified" is set, among the specified print setting items.

If there exist no setting items for which the value "to be specified" is set, among the print setting items, a print operation is started and performed according to the set values. Meanwhile, if there exist any setting items for which the value "to be specified" is set, among the print setting items, a print operation is put on hold. And a setting screen D4 is displayed on the display 172 of the operation panel 17, wherein a message 101 telling that the value "to be specified" is set for the setting items "flap position" and "flap state", is provided together with a "flap position" button 102 and a "flap state" button 103, for example as shown in FIG. 8.

Figure 8:
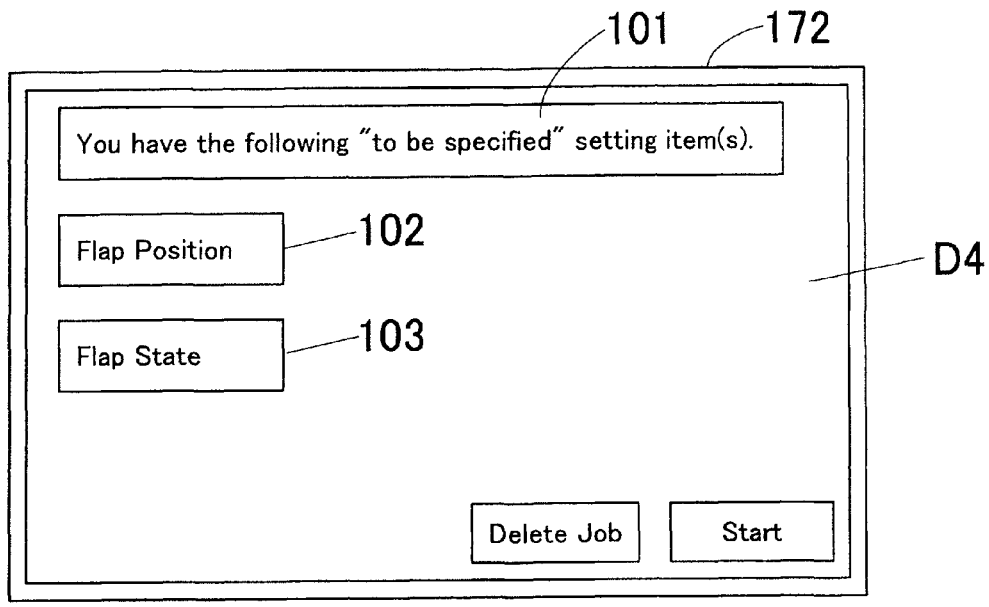
FIG. 8 is a view showing a setting screen displayed on a display of the MFP.
Figure 9:
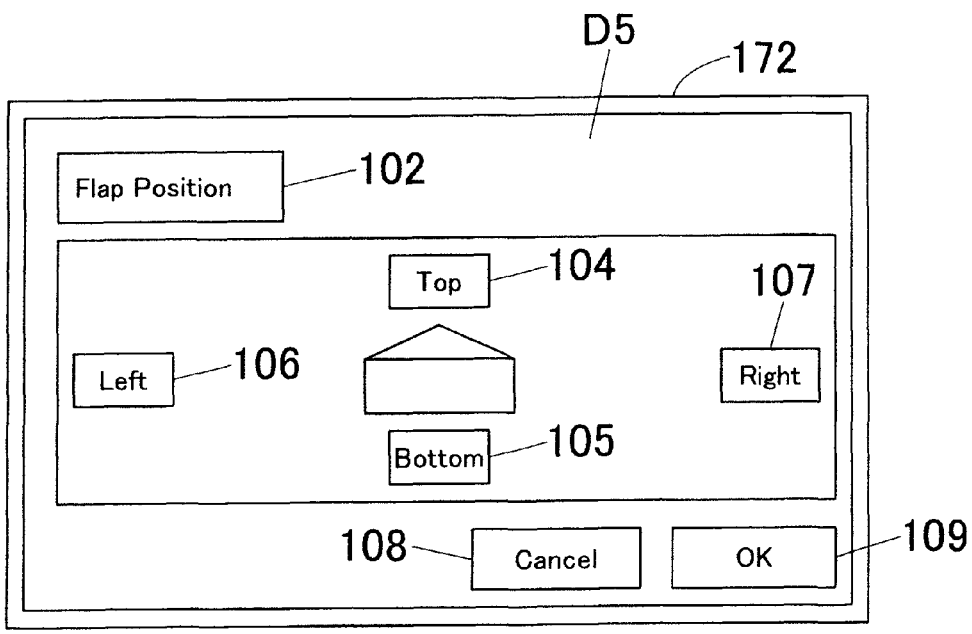
FIG. 9 is a view showing a next screen displayed when a "flap position" button is pressed via the setting screen of FIG. 8.

When a user presses the "flap position" button 102 via the setting screen D4 of FIG. 8, the screen is switched to a setting screen D5 allowing to set a value for "flap position", which is shown in FIG. 9. And thus, the user is allowed to select among the values 104 through 107: "left", "right", "top" and "bottom". If a user presses a "cancel" button 108 via the setting screen D5 of FIG. 9, the screen is returned to the screen D4 of FIG. 8. If a user presses an "OK" button 109 via the setting screen D5 of FIG. 9, the screen is switched to a setting screen D6 shown in FIG. 10, wherein a message 101 telling that the value "to be specified" is set for the setting item "flap state", is provided together with the "flap state" button 103.

Figure 10:
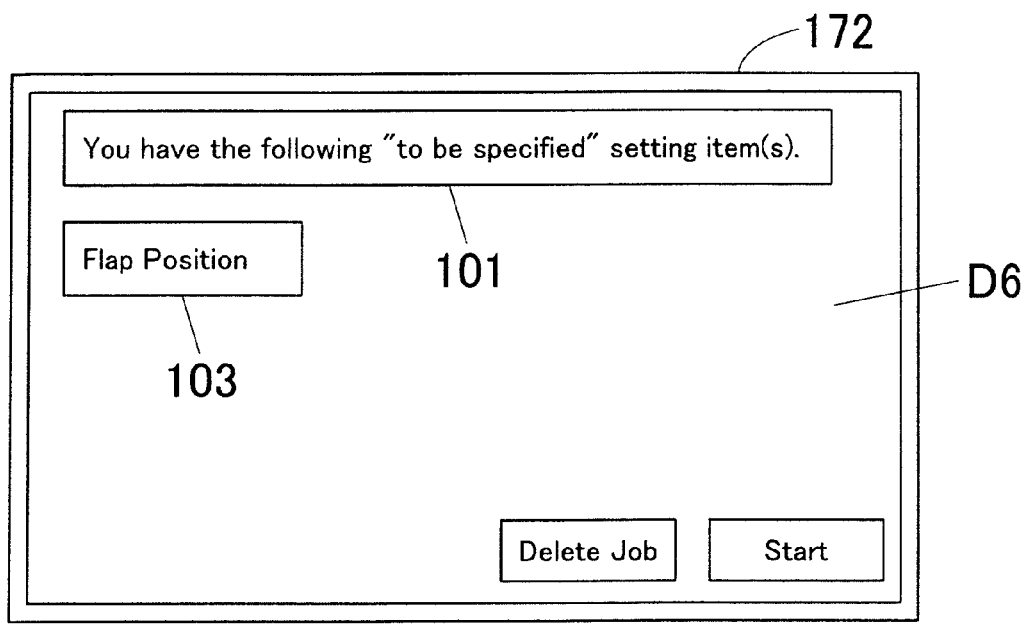
FIG. 10 is a view showing a next screen displayed when an "OK" button is pressed via the screen of FIG. 9.
Figure 11:
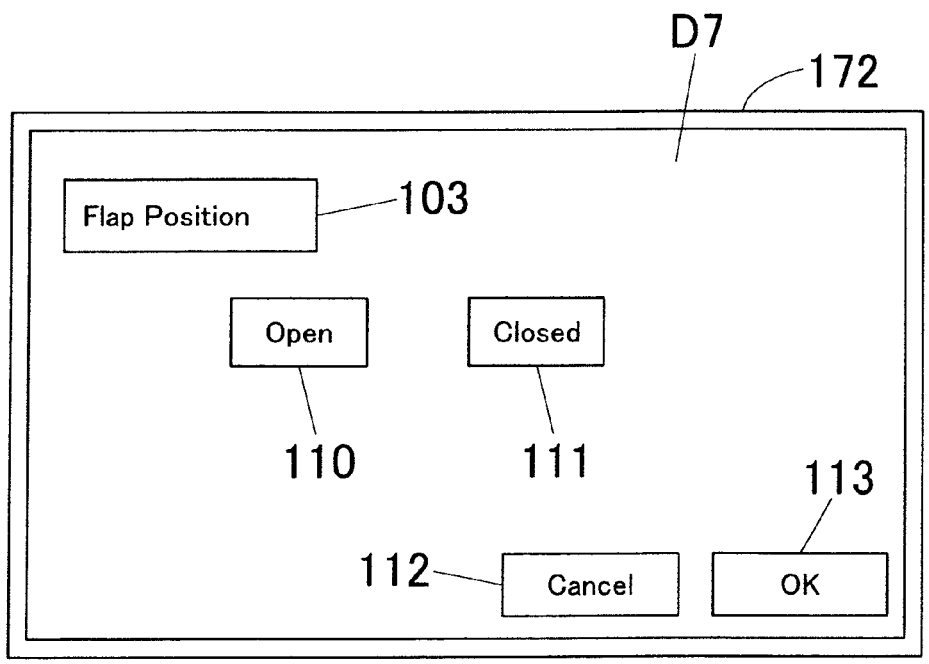
FIG. 11 is a view showing a next screen displayed when a "flap state" button is pressed via the screen of FIG. 10.

When a user presses the "flap state" button 103 via the setting screen D6 of FIG. 10, the screen is switched to a setting screen D7 allowing to set a value for "flap state", which is shown in FIG. 11. And thus, the user is allowed to select among the values 110 and 111, "open" and "closed".

When a user presses a "cancel" button 112 via the setting screen D7 of FIG. 11, the screen is returned to the screen D6 of FIG. 10. And then, when a user presses an "OK" button 113, a print operation is started.

As described above, if a user sets the value "to be specified" for a setting item by operating the terminal apparatus 2, hoping to set a value for the setting item later by operating the MFP 1, a setting screen allowing to set a value for the setting item is properly displayed on the display 172 of the MFP 1, and thus the user can set a value for the setting item on the side of the MFP 1. Therefore, a user can avoid a trouble before the fact, even if the trouble is not recognizable when setting values for respective setting items by operating the terminal apparatus 2 but turns to be recognizable when arriving at the MFP 1, and also the inconvenience that the user returns to the terminal apparatus 2 and sets values again, can be eliminated. That would improve usability.

Furthermore, if no value is set for a setting item by operating the terminal apparatus 2, a default value recorded in the MFP 1 is validated. Therefore, even if a user forgets setting a value for a setting item by operating the terminal apparatus 2, a default value set recorded in the MFP 1 is automatically employed and according to the value, a job can be properly executed.

If no default value is set for a setting item and recorded in the MFP 1, a value set for the setting item by operating the terminal apparatus 2 is validated. In this embodiment, if the value "to be specified" is set for the setting item by operating the terminal apparatus 2, the MFP 1 judges that the value "to be specified" is set for the setting item, then displays a setting screen on the display 172. Meanwhile, if no value is set for a setting item by operating the terminal apparatus 2, the MFP 1 judges as if the value "to be specified" is set for the setting item, then displays a setting screen on the display 172.

Therefore, if a user hopes to set a value for a setting item later by operating the MFP 1, it is only necessary to set the value "to be specified" for the setting item or leave the setting item unspecified, and thus the user can set a value for the setting item later by operating the MFP 1.

To print on envelopes like in this embodiment, it should be noted that envelopes are saclike, and varied in materials for example. This makes it more difficult to control a print operation using envelopes, compared to that using regular paper, and paper jams (also referred to simply as "jams") tend to occur. Jams depend on a flap position, a flap state (open/closed), an envelope feeding direction, and an envelope feeding slot.

To resolve such troubles, when a user sets a value for a setting item for which the value "to be specified" is set, via a setting screen displayed on the 172 of the MFP 1, jam log information of the past, recorded in the memory 15, may be displayed on the display 172 of the MFP 1, as shown in FIG. 12.

With reference to the jam log information displayed thereon, the user sets values for paper feeding inlet, paper feeding direction, paper material, flap position, flap state and etc.

In many cases, users have a concrete plan of preferable envelopes to be printed, which paper material, which flap position and which flap state. Therefore, another configuration may be employed, wherein after the user sets a value set for the setting item for which the value "to be specified" is set, the MFP 1 judges which paper feeding inlet, which paper feeding direction, which surface up paper will be fed with, and etc. based on the jam log information, and if need any changes, the MFP 1 displays a message on the display 172 to let the user know.

As described above, referring to trouble information of the past could increase the possibility of succeeding in avoiding a trouble before the fact about a print job.

If a user does not operate the MFP 1 for a predetermined time, after the MFP 1 judges that there exists any unspecified setting items then displays on the display 172 a setting screen allowing to specify values for the unspecified setting items, the MFP 1 may employ default values (if recorded in the MFP 1) and start a print operation, immediately without waiting for a user operation, in order not to block out other users' use of the MFP 1. Alternatively, the MFP 1 may temporarily evacuate a job into the memory 15 or etc. then works according to a following user's print instruction. In this case, the user is later allowed to call out the job temporarily evacuated in the memory 15 and specify values again for the unspecified setting items.

Meanwhile, if no default values are recorded in the MFP 1 and the user does not operate the MFP 1 for a predetermined time, a job may be temporarily evacuated into the memory 15 or etc., or may be deleted.

Figure 13:
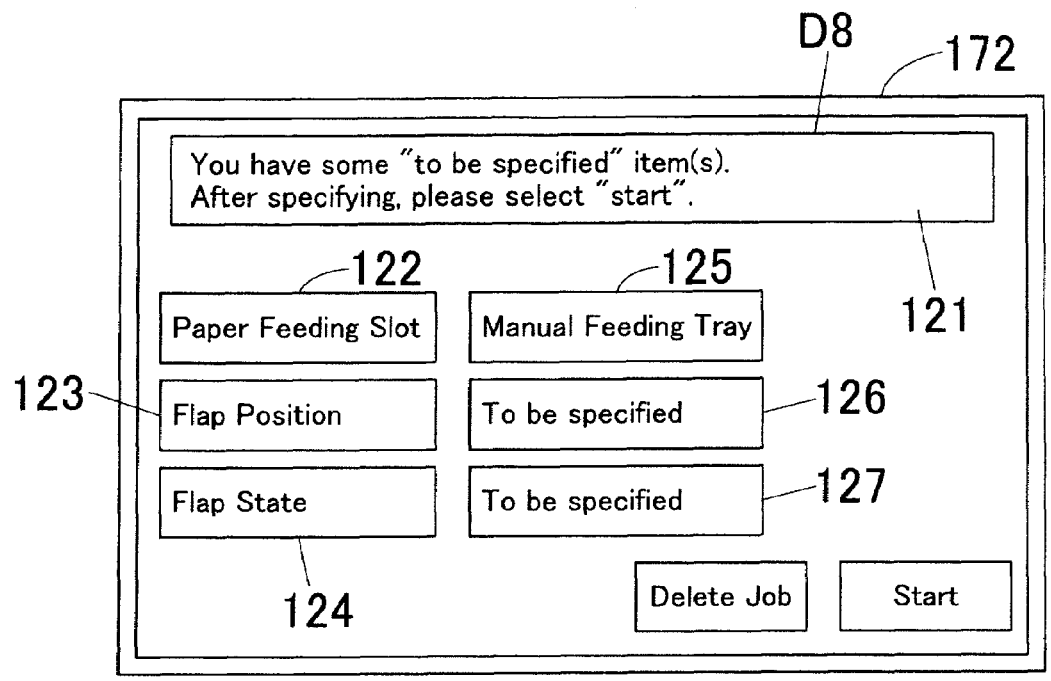
FIG. 13 is a view showing a setting screen where the value "to be specified" and other values are set in advance for setting items.

Meanwhile, when the MFP 1 displays on the display 172, a setting screen that allows to specify values for the unspecified setting items, the setting screen displayed thereon may be a screen D8 of FIG. 13, additionally showing a value (the value 125, "manual feeding tray") and a setting item (the setting item 122, "paper feeding inlet", in this example of FIG. 13) for which the value is set in advance by operating the terminal apparatus 2, in order to allow to change the value for the specified setting item as well.

Figure 14:
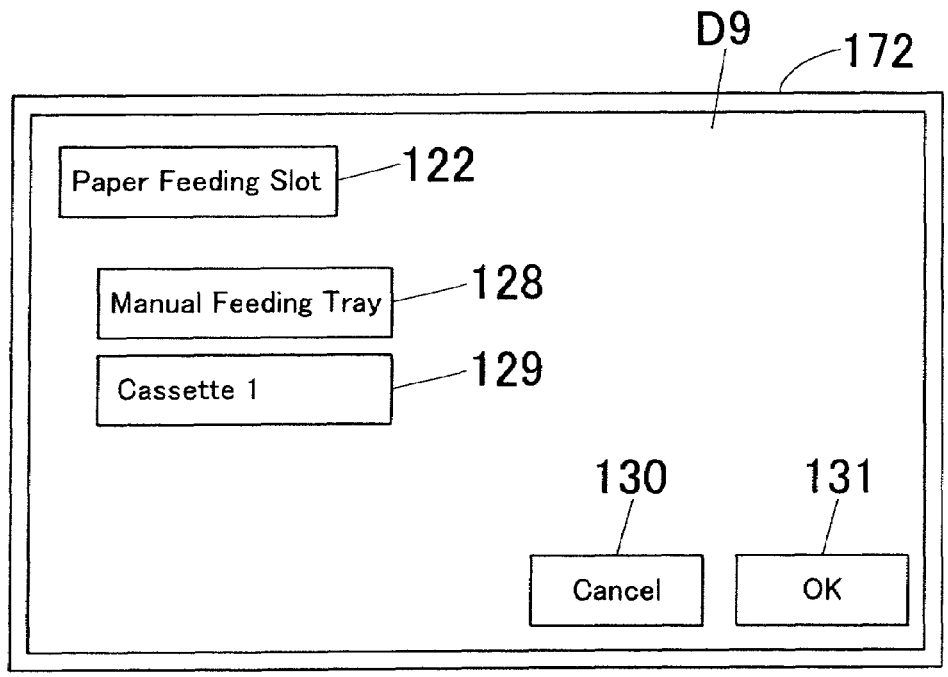
FIG. 14 is a view showing a next screen displayed when a "paper feeding inlet" button is pressed via the screen of FIG. 13.

In this example of FIG. 13, when a user presses a "paper feeding inlet" button indicating the setting item 122 "paper feeding inlet", the screen is switched to a screen D9 of FIG. 14, allowing to set a value 128 "manual feeding tray" or a value 129 "cassette 1", for the setting item.

Figure 15:
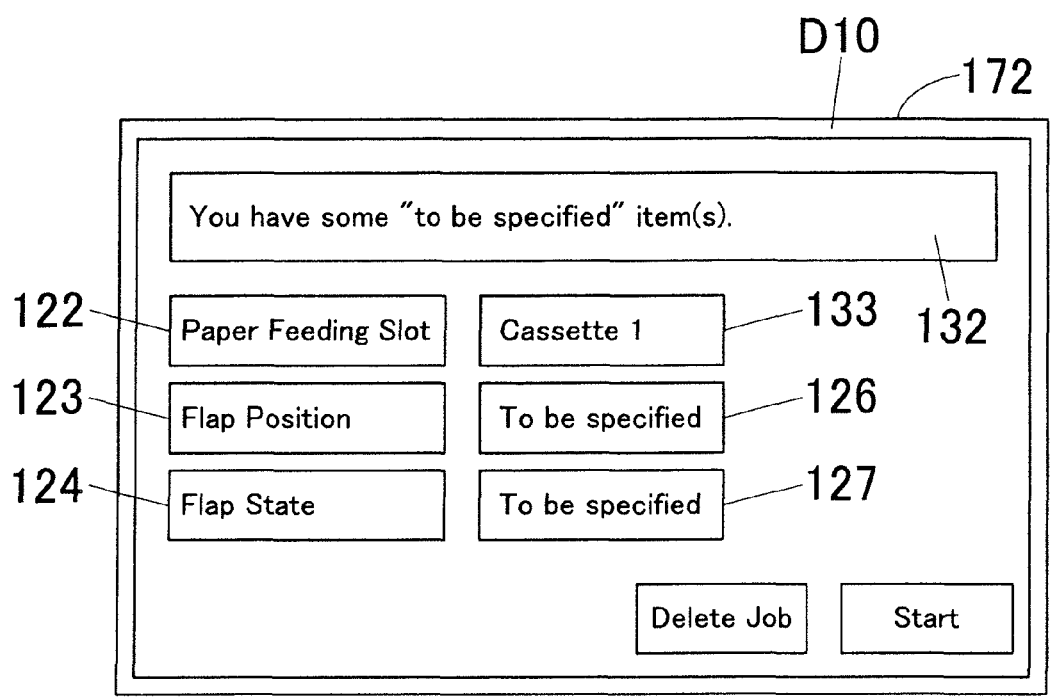
FIG. 15 is a view showing a next screen displayed when a "cassette 1" button is selected then an "OK" button is pressed via the screen of FIG. 14.

When a user presses a "cancel" button 130 via the screen D9 of FIG. 14, the screen is returned to the screen D8 of FIG. 13. And then, when a user selects the value 129 "cassette 1" for example, then presses the "OK" button, the set value is decided and the screen is switched to a setting screen D10 of FIG. 15. As shown in the setting screen D10 of FIG. 15, the value set for the setting item 122 is changed to a value 133 "cassette 1". And then, when a user presses a "start" button, a print operation is started.

On the other hand, the MFP 1 displays a setting screen that allows to specify values for the setting items for which the value "to be specified" is set. However, the displayed setting screen may not be the setting screen D8 of FIG. 13, additionally showing a setting item for which a value is set in advance. Instead, another configuration may be employed, wherein the displayed setting screen is another one that allows the user to specify values for the unspecified setting items and also allows to select whether or not to additionally show the specified setting item, by pressing a selection button provided thereon, and when a user presses the button, the screen D8 of FIG. 13 is displayed.

As described above, a value set in advance for a setting item can be changed. With this configuration, a set value can be changed flexibly according to the need.

When a user gives a print instruction after completing setting values for the unspecified setting items, the MFP 1 may calculate an incidence of troubles in the case where performing a print operation with the currently specified paper feeding direction and paper feeding inlet, based on a trouble log (jam log, for example) of the past. If judges that that the incidence of troubles is low or that the currently specified paper direction and paper feeding inlet are appropriate, the MFP 1 may perform a print operation immediately. Meanwhile, if judges that the incidence of troubles is high or that there exist another paper direction or paper feeding inlet appropriate for printing, a message may be displayed on the display 172, to allow the user know the fact and request to try printing again with different values.

In the embodiment described above, the value "to be specified" is set for the setting items "flap position" and "flap state" of envelopes. Alternatively, another configuration may be employed, wherein the value "to be specified" is set for a setting item other than those, for example, "paper feeding inlet".

Concretely, a user sets the value "to be specified" for the setting item "paper feeding inlet" then gives a print instruction. And the MFP 1 recognizes that a paper feeding inlet is "to be specified", puts on hold a print operation instead of starting it, and displays a setting screen on the display 172. Then the user arrives at the MFP 1, and sets a value for "paper feeding inlet" via the setting screen after visually checking the state of paper actually loaded on the respective paper feeding inlets. And the MFP 1 takes paper from the specified paper feeding inlet and starts a print operation.

An advantage of employing the configuration that allows to set the value "to be specified" for the setting item "paper feeding inlet", will be explained as the following. That is, for example, the MFP 1 has three paper feeding cassettes and paper of "paper size=A4" and "paper type=both-side printable paper" is supposed to be loaded on each of the paper feeding cassettes. Actually, A4-sized paper but having been printed on one side is loaded on a paper feeding inlet 1 against the set value, meanwhile right paper is properly loaded in paper feeding inlets 2 and 3 according to the setting.

For example, a user gives a print instruction after setting the values "paper size=A4" and "paper type=both-side printable paper", via a print setting screen of a printer driver installed on the terminal apparatus 2. Accepting the set values, the MFP 1 starts taking paper from the paper feeding cassette 1 and recognizes that the paper actually loaded thereon has been printed on one side. As a result, the user fails to obtain his/her satisfying print output.

Meanwhile, a user gives a print instruction after setting "paper size=A4" and "paper feeding inlet=to be specified" via a setting screen displayed on the terminal apparatus 2. And the MFP 1 puts on hold a print operation and displays on the display 172, a setting screen that allows to set a value for "paper feeding inlet". Then the user selects a value after visually checking paper actually loaded on the paper cassettes of the MFP 1. In this example, the user will select "paper feeding inlet=cassette 2" or "paper feeding inlet=cassette 3".

As described above, the configuration that allows to 4set the value "to be specified" for the setting item "paper feeding inlet" is advantageous, since possible troubles can be prevented even if information recorded in the MFP 1 does not match an actual state thereof. As a result, the user properly obtains his/her satisfying print output.

Alternatively, yet another configuration that allows to set the value "to be specified" for the setting item "paper size" or "paper type", may be employed, like in the case of "paper feeding inlet". Concretely, a user sets the value "to be specified" for "paper size" or "paper type" then gives a print instruction. And the MFP 1 detects that a paper size or a paper type is "to be specified", puts on hold a print operation, and displays on the display 172, a setting screen that allows to set a value for "paper size" or "paper type". Then the user sets a value after visually checking the state of paper actually loaded on the paper feeding inlets (paper feeding cassettes), the MFP 1's operation mode, the state of paper stock, and etc. And the MFP 1 takes paper of the specified paper size or paper type, from one of the paper feeding inlets, and starts a print operation.

An advantage of employing the configuration that allows to set the value "to be specified" for the setting item "paper size" or "paper type", will be explained as the following. That is, for example, a user casually hopes to print on paper of a special paper size or paper type if any, meanwhile the MFP 1 is required to operate by a special operation mode in order to print on paper of a special paper size or paper type, and it is not easy for the user to set the special operation mode. In this case, the user sets the value "paper size=to be specified" or "paper type=to be specified" via a setting screen displayed on the terminal apparatus 2 then gives a print instruction. And the MFP 1 puts on hold a print operation and displays on the display 172, a setting screen that allows to set a value for "paper size" or "paper type".

Checking the current operation mode (state), if it is the special operation mode already, the user sets a preferable paper size. If it is a normal operation mode and it is difficult to change it to the special operation mode (state), the user sets a normal paper size or paper type.

As described above, the configuration that allows to set the value "to be specified" for "paper size" or "paper type" is advantageous, since the user can give a print instruction by operating the terminal apparatus 2 without knowing the operation mode the MFP 1, then sets an appropriate value for "paper size" after checking the operation mode of the MFP 1. As a result, the user properly obtains his/her satisfying print output.

Figure 16:
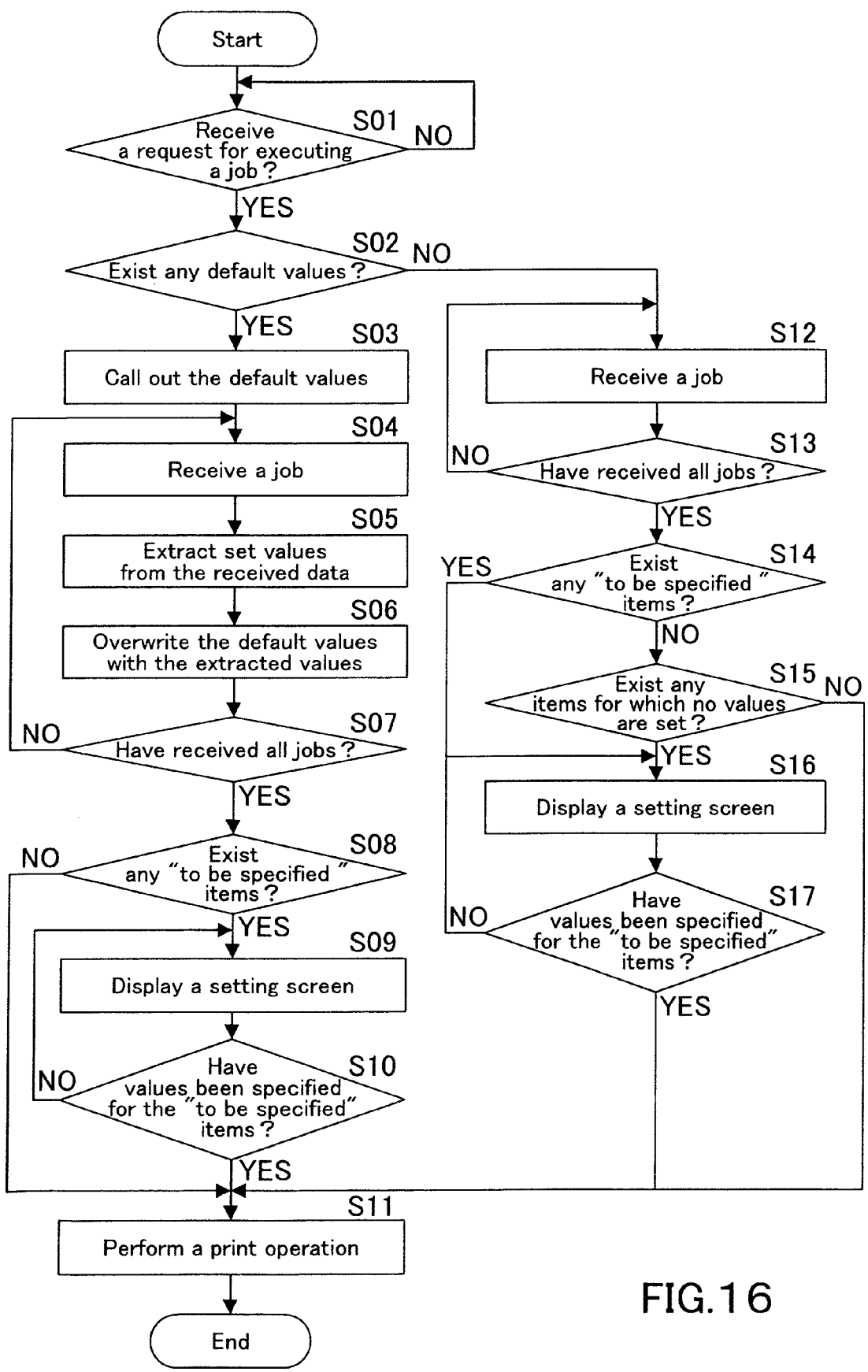
FIG. 16 is a flowchart representing a procedure executed in the MFP.

FIG. 16 is a flowchart representing a procedure executed in the MFP 1. This procedure is executed by the CPU 11 according to a program recorded in a recording medium such as the ROM 12.

In Step S01, the routine waits until a request for executing a print job is received from the terminal apparatus 2. If a request for executing a print job is received therefrom (YES in Step S01), then it is judged in Step S02, whether or not any default values are recorded. If any default values are recorded (YES in Step S02), the default values are called out from the memory 15 in Step S03.

Subsequently, a job is received in Step S04, values set for respective setting items are extracted from the received job in Step S05, and the called-out default values are overwritten with the extracted values in Step S06.

And in Step S07, it is judged whether or not all jobs have been received. If all jobs have not received yet (NO in Step S07), the routine goes back to Step S04 and repeats Steps S04 through S07. If all jobs have been received (YES in Step S07), then it is judged in Step S08, whether or not there exist any setting items for which the value "to be specified" is set, among the setting items to execute the jobs, which default values have been overwritten with the received values.

If there exists no setting item for which the value "to be specified" set (NO in Step S08), this means that all values are specified for the setting items, thus a print operation is performed in Step S11.

If there exists any setting items for which the value "to be specified" is set (YES in Step S08), a setting screen is displayed on the display 172 of the operation panel 17, in order to allow the user to specify values for the setting items, in Step S09. And it is judged in Step S10, whether or not values have been specified for the unspecified setting items in Step S10.

If values have not been specified yet (NO in Step S10), the routine goes back to Step S09 and keep the setting screen displayed thereon. If values have been specified for the unspecified setting items (YES in Step S10), a print operation is performed in Step S11.

Meanwhile, if no default values are recorded in the MFP 1 (NO in Step S02), a print job is received in Step S12, and it is judged in Step S23, whether or not all jobs have been received.

If all jobs have not been received yet (NO in Step S13), the routine goes back to Step S12 and continue receiving. If all jobs have been received (YES in Step S13), then it is judged in Step S14, whether or not there exist any setting items for which the value "to be specified" is set, among the setting items to execute the received jobs.

If there exists no setting items for which the value "to be specified" is set (NO in Step S14), then it is judged in Step S15, whether or not there exist any setting items for which no values are set, among the setting items to execute the received jobs. If there exist any setting items for which no values are set (YES in Step S15), the routine proceeds to Step S16. Also, if there exist any setting items for which the value "to be specified" is set, among the setting items to execute the received jobs (YES in Step S14), the routine proceeds to Step S16.

In Step S16, a setting screen is displayed on the display 172 of the operation panel 17, in order to allow the user to specify values for the unspecified setting items. And it is judged in Step S17, whether or not values have been specified.

If values have not been specified yet (NO in Step S17), the routine goes back to Step S16 and keep the setting screen displayed thereon, and if values have been specified for the unspecified setting items (YES in Step S17), a print operation is performed in Step S11. Also, if there exists no setting items for which no values are set, among the setting items to execute the jobs (NO in Step S15), this means that there is no setting items for which the value "to be specified" is set, thus a print operation is performed in Step S11.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A job execution system in which an image processing apparatus and a terminal apparatus interconnected via a network, comprising:
   the terminal apparatus comprising:
      an accepter that accepts a value to execute a job by the image processing apparatus set by a user for one or more than one setting item, wherein the accepter accepts an unfixed state whose value will be specified for at least one setting item by the user at the image processing apparatus later; and
      a transmitter that transmits the job including the set value and the set unfixed state accepted by the accepter, to the image processing apparatus, and
   the image processing apparatus comprising:
      a receiver that receives the job transmitted by the terminal apparatus;
      a job executor that executes the job received by the receiver;
      a judger that judges whether or not there exists a setting item for which the unfixed state is set in advance, among those included in the job received by the receiver;
      a display portion; and
      a controller that makes the job executor put on hold execution of the job if the judger judges that there exists a setting item for which the unfixed state is set in advance, then further makes the display portion display a setting screen that allows a user to specify a value for the setting item for which the unfixed state is set in advance.

2. The job execution system recited in claim 1, wherein:
   if the unfixed state or another value set in advance for a setting item to execute the job is not recorded as a default value in the image processing apparatus and no value is set in advance for the setting item by the terminal apparatus, the judger judges as if there exists a setting item for which the unfixed state is set in advance.

3. The job execution system recited in claim 1, wherein:
   the controller of the image processing apparatus makes the job executor execute the job after the value set by a user via the setting screen displayed on the display portion is specified.

4. The job execution system recited in claim 1, wherein:
   the job is a print job and the set value is used for printing.

5. A job execution system in which an image processing apparatus and a terminal apparatus interconnected via a network, comprising:
   the terminal apparatus comprising:
      an accepter that accepts a value set by a user for one or more than one setting item to execute a job by the image processing apparatus; and
      a transmitter that transmits the job including the set value accepted by the accepter to the image processing apparatus, and
   the image processing apparatus comprising:
      a receiver that receives the job transmitted by the terminal apparatus;
      a job executer that executes the job received by the receiver;
      a judger that judges whether or not there exists a setting item for which the value "to be specified" is set in advance, among those included in the job received by the receiver;
      a display portion;
      a controller that makes the job executor put on hold execution of the job if the judger judges that there exists a setting item for which the value "to be specified" is set in advance, then further makes the display portion display a setting screen that allows a user to specify a value for the setting item for which the value "to be specified" is set in advance; and a memory that records in itself as a default value, the value "to be specified" or another value set in advance for a setting item to execute the job and a decision portion that specifies a value for a setting item by validating the value "to be specified" or another value if such a value is set in advance for the setting item by the terminal apparatus, or by validating the default value recorded in the memory if no value is set in advance for the setting item by the terminal apparatus;

wherein the judger judges whether or not there exists a setting item for which the value "to be specified" is set, among the setting items for which values are specified by the decision portion.

6. An image processing apparatus comprising:

a receiver that receives a job including a value to execute the job by the image processing apparatus set by a user for one or more than one setting item and an unfixed state whose value will be specified for at least one setting item set by a user at the image processing apparatus later transmitted by a terminal apparatus via a network;

a job executor that executes the job received by the receiver;

a judger that judges whether or not there exists a setting item for which the unfixed state is set in advance, among one or more than one setting item included in the job received by the receiver to execute the job;

a display portion; and a controller that makes the job executor put on hold execution of the job if the judger judges that there exists a setting item for which the unfixed state is set in advance, then further makes the display portion display a setting screen that allows a user to specify a value for the setting item for which the unfixed state is set in advance.

7. The image processing apparatus recited in claim 6, wherein:

if the value unfixed state or another value set in advance for a setting item to execute the job is not recorded therein as a default value and no value is set in advance for the setting item by the terminal apparatus, the judger judges as if there exists a setting item for which the value unfixed state is set in advance.

8. The image processing apparatus recited in claim 6, wherein:

the controller makes the job executor execute the job after the value set by a user via the setting screen displayed on the display portion is specified.

9. The image processing apparatus recited in claim 6, wherein:

the job is a print job and the set value is used for printing.

10. An image processing apparatus comprising:

a receiver that receives a job transmitted by a terminal apparatus via a network;

a job executer that executes the job received by the receiver;

a judger that judges whether or not there exists a setting item for which the value "to be specified" is set in advance, among one or more than one setting item included in the job received by the receiver to execute the job;

a display portion;

a controller that makes the job executor put on hold execution of the job if the judger judges that there exists a setting item for which the value "to be specified" is set in advance, then further makes the display portion display a setting screen that allows a user to specify a value for the setting item for which the value "to be specified" is set in advance; and a memory that records in itself as a default value, the value "to be specified" or another value is set in advance for a setting item to execute the job; and a decision portion that specifies a value for a setting item by validating the value "to be specified" or another value if such a value is set in advance for the setting item by the terminal apparatus, or by validating the default value recorded in the memory if no value is set in advance for the setting item by the terminal apparatus, and wherein:

the judger judges whether or not there exists a setting item for which the value "to be specified" is set, among the setting items for which values are specified by the decision portion.

11. A job execution method executed by a job execution system in which an image processing apparatus and a terminal apparatus are interconnected via a network, comprising:

the terminal apparatus's accepting a value to execute a job by the image processing apparatus set by a user for one or more than one setting item, wherein the terminal apparatus accepts an unfixed state whose value will be specified for at least one setting item by the user at the image processing apparatus later;

the terminal apparatus's transmitting to the image processing apparatus, the job including the accepted set value and the set unfixed state;

the image processing apparatus's receiving the job transmitted by the terminal apparatus;

the image processing apparatus's executing the received job;

the image processing apparatus's judging whether or not there exists a setting item for which the unfixed state is set in advance, among the setting items included in the received job; and the image processing apparatus's putting on hold execution of the job if it is judged that there exists a setting item for which the unfixed state is set in advance, then further making a display portion display a setting screen that allows a user to specify a value for the setting item for which the unfixed state is set in advance.

12. The job execution method recited in claim 11, wherein:

if the unfixed state or another value set in advance for a setting item to execute the job is not recorded in the image processing apparatus as a default value and no value is set in advance for the setting item by the terminal apparatus, the judger judges as if there exists a setting item for which the unfixed state is set in advance.

13. The job execution method recited in claim 11, wherein:

the job is executed after the value set by a user via the setting screen displayed on the display portion is specified.

14. The job execution method recited in claim 11, wherein:

the job is a print job and the set value is used for printing.

15. A job execution method executed by a job execution system in which an image processing apparatus and a terminal apparatus are interconnected via a network, comprising:

the terminal apparatus's accepting a value set by a user for one or more than one setting item to execute a job by the image processing apparatus;

the terminal apparatus's transmitting to the image processing apparatus, the job including the accepted set value;

the image processing apparatus's receiving the job transmitted by the terminal apparatus;

the image processing apparatus's executing the received job;

the image processing apparatus's judging whether or not there exists a setting item for which the value "to be specified" is set in advance, among the setting items included in the received job;

the image processing apparatus's putting on hold execution of the job if it is judged that there exists a setting item for which the value "to be specified" is set in advance, then further making a display portion display a setting screen that allows a user to specify a value for the setting item for which the value "to be specified" is set in advance, wherein the value "to be specified" or another value set in advance for a setting item to execute the job is recorded as a default value in a memory of the image processing apparatus; and deciding a value for a setting item by validating the value "to be specified" or another value if such a value is set in advance for the setting item by the terminal apparatus, or by validating the default value recorded in the memory if no value is set in advance for the setting item by the terminal apparatus, wherein it is judged whether or not there exists a setting item for which the value "to be specified" is set, among the setting items for which values are specified.

16. A non-transitory computer readable recording medium having a job execution program recorded therein to make a computer of an image processing apparatus execute:

receiving a job including a value to execute the job by the image processing apparatus set by a user for one or more than one setting item and an unfixed state whose value will be specified for at least one setting item set by a user at the image processing apparatus later transmitted by a terminal apparatus via a network;

executing the received job;

judging whether or not there exists a setting item for which the unfixed state is set in advance, among one or more than one setting item included in the received job to execute the job;

putting on hold execution of the job if it is judged that there exists a setting item for which the unfixed state is set in advance, then further making the display portion display a setting screen that allows a user to specify a value for the setting item for which the unfixed state is set in advance.

17. The computer readable recording medium recited in claim 16, wherein:

if the unfixed state or another value set in advance for a setting item to execute the job is not recorded in the image processing apparatus as a default value and no value is set in advance for the setting item by the terminal apparatus, it is judged as if there exists a setting item for which the unfixed state is set in advance, according to the job execution program.

18. The computer readable recording medium recited in claim 16, wherein:

the job is executed by the job executor according to the job execution program, after the value set by a user via the setting screen displayed on the display portion is specified.

19. The computer readable recording medium, recited in claim 16, wherein:

the job is a print job and the set value is used for printing.

20. A non-transitory computer readable recording medium having a job execution program recorded therein to make a computer of an image processing apparatus execute:

receiving a job transmitted by a terminal apparatus via a network;

executing the received job;

judging whether or not there exists a setting item for which the value "to be specified" is set in advance, among one or more than one setting item included in the received job to execute the job;

putting on hold execution of the job if it is judged that there exists a setting item for which the value "to be specified" is set in advance, then further making the display portion display a setting screen that allows a user to specify a value for the setting item for which the value "to be specified" is set in advance, wherein the value "to be specified" or another value set in advance for a setting item to execute the job is recorded as a default value in a memory of the image processing apparatus;

deciding a value for a setting item by validating the value "to be specified" or another value if such a value is set in advance for the setting item by the terminal apparatus, or by validating the default value recorded in the memory if no value is set in advance for the setting item by the terminal apparatus, wherein it is judged whether or not there exists a setting item for which the value "to be specified" is set, among the setting items for which values are specified.

* * * * *